United States Patent [19]

Grace

[11] B 3,982,161
[45] Sept. 21, 1976

[54] TIME-RATIO CONTROL HAVING BIDIRECTIONAL SPEED POTENTIOMETER

[75] Inventor: Michael H. Grace, Griffith, Ind.

[73] Assignee: Allis-Chalmers Corporation, Milwaukee, Wis.

[22] Filed: Sept. 3, 1974

[21] Appl. No.: 502,973

[44] Published under the second Trial Voluntary Protest Program on January 27, 1976 as document No. B 502,973.

[52] U.S. Cl................................. 318/257; 318/341
[51] Int. Cl.² .......................................... H02P 7/08
[58] Field of Search..................... 318/139, 257, 341

[56] References Cited
UNITED STATES PATENTS

| | | | |
|---|---|---|---|
| 3,209,227 | 9/1965 | Berman et al. | 318/257 |
| 3,349,309 | 10/1967 | Dannettell | 318/341 |
| 3,683,253 | 8/1972 | Rummel et al. | 318/341 X |
| 3,684,945 | 8/1972 | Hermansson et al. | 318/257 X |
| 3,713,009 | 1/1973 | Poppinger et al. | 318/257 X |

Primary Examiner—Robert K. Schaefer
Assistant Examiner—W. E. Duncanson, Jr.
Attorney, Agent, or Firm—Lee H. Kaiser

[57] ABSTRACT

A vehicle is driven by a traction motor energized by pulses of current from a battery conducted by a power switch and has forward and reverse contactors to control motor direction and a variable time-ratio control for regulating motor speed including an RC timing circuit in series with a bidirectional speed potentiometer whose resistance element is provided with a midtap for selectively varying time duration of the pulses. The speed potentiometer wiper is coupled to a manual speed and direction selecting lever having a neutral position wherein the speed potentiometer wiper engages the midtap so that duty cycle of the pulses is minimum and neither contactor is energized, and actuation of the lever in either direction from neutral increases the time duration of the pulses and also energizes the forward or the reverse contactors to thereby control direction of vehicle travel.

1 Claim, 1 Drawing Figure

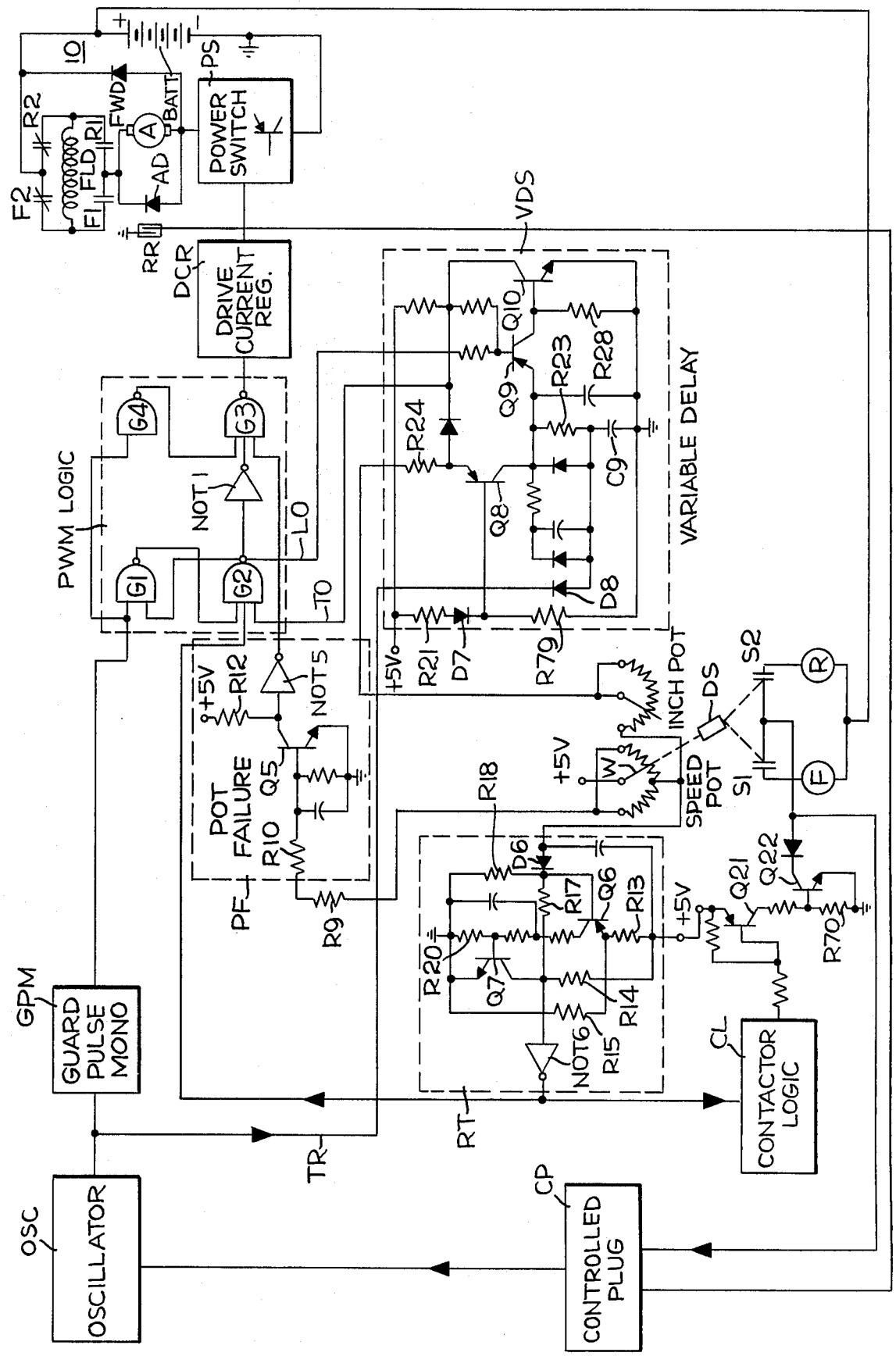

TIME-RATIO CONTROL HAVING BIDIRECTIONAL SPEED POTENTIOMETER

This invention relates to time-ratio controls such as pulse width modulation systems for regulating the speed and direction of a reversible d.c. traction motor.

It is an object of the invention to provide an improved time-ratio control for a d.c. traction motor wherein a bidirectional speed potentiometer regulates motor speed and movement of a speed and direction selecting member coupled to its wiper in opposite directions from a neutral, minimum duty cycle position selectively varies the time duration of pulses of current supplied from a battery to the motor and also selectively controls energization of forward and reverse contactors which regulate motor direction.

This and other objects and advantages of the invention will be more readily apparent from the following detailed description when considered in conjunction with annexed drawing wherein the single FIGURE is a schematic circuit diagram of a variable time-ratio control embodying the invention with certain circuit elements shown in block form.

Referring to the drawing, the wheels of a vehicle such as a fork lift truck (not shown) may be driven by a reversible series traction motor 10 having an armature A and a field winding FLD adapted to be connected in series with a power switch PS across the terminals of a battery BATT through the normally open contacts F1 of a forward contactor and the normally closed contacts R2 of a reverse contactor to drive the truck in the forward direction, or through the normally open contacts R1 of the reverse contactor and the normally closed contacts F2 of the forward contactor to propel the vehicle to the rear. A free wheeling diode FWD in shunt to to the series arrangement of armature A and field winding FLD provides a circuit for the inductive motor current during the interpulse period when power switch PS is open. An armature diode, or plugging diode AD in shunt to armature A provides a path for current flow when motor 10 is acting as a generator.

Motor 10 is energized by unidirectional pulses of current conducted by power switch Ps, and the speed of motor 10 may be regulated by a time-ratio control such as the pulse width modulation (PWM) control disclosed in U.S. Pat. No. 3,803,473 to F. A. Stich; U.S. Pat. No. 3,828,235 to R. G. Price and F. A. Stich; U.S. Pat. No. 3,803,471 to R. G. Price, F. A. Stich, and D. L. Moore; and copending U.S. application Ser. No. 317,596 of F. A. Stich, filed Dec. 22, 1972, having the same assignee as this invention, which selectively regulates the time duration, and thus the duty cycle, of variable width pulses of voltage from battery BATT applied by power switch PS to motor 10 to proportionally vary the average voltage applied to the motor.

An oscillator OSC generates a train of triggering pulses which establishes the pulse frequency of the time-ratio control. Each triggering pulse from oscillator OSC triggers a guard pulse monostable multivibrator GPM which generates a narrow negative-going guard pulse of fixed width that determines the minimum on-time of power switch PS. Each triggering pulse from oscillator OSC on a lead TR discharges a timing capacitor C9 to initiate a timing cycle in a variable delay circuit VDS. Each negative-going (logic 0) guard pulse from multivibrator GPM provides a logic 1 output from a logic NAND gate G1 of a PWM LOGIC circuit to set a bistable latch comprising two interlocked NAND gates G1 and G2. The logic 1 output from gate G1 provides logic 0 from gate G2 over a lead L0 to activate, or enable variable delay circuit VDS by forward biasing the base of a PNP transistor Q9 to turn it on. The logic 0 output from gate G2 also provides logic 1 from inverter, or NOT gate NOT 1 to an input of NAND gate G3. The logic 0 guard pulse is also applied to an input of a NAND gate G4 of the PWM LOGIC which provides logic 1 output to gate G3. All inputs to gate G3 are now logic 1, and gate G3 provides a logic 0 output signal which is the leading edge of the control pulse and turns on a drive current regulator DCR to supply a base drive pulse to power switch PS and turn it on. Turning on power switch PS applies a unidirectional voltage pulse from battery BATT to motor 10.

Variable delay circuit VDS includes a timing circuit having a timing capacitor C9 with one electrode grounded and which is charged from a power supply +5V through the series arrangement of a resistance R23, the emitter-collector circuit of a charging current PNP transistor Q8, an emitter resistor R24, an INCH POT potentiometer, and a SPEED POT potentiometer. Each triggering pulse from oscillator OSC over lead TR is coupled to timing capacitor C9 through a diode D8 to discharge the timing capacitor and thereby reset the timing circuit. Variable delay circuit VDS also includes charging current transistor Q8 whose collector current is varied by potentiometer SPEED POT to regulate the timing delay and a PNP timing transistor Q9 which is turned on in response to a predetermined voltage across timing capacitor C9. When transistor Q9 turns on, a voltage is developed across its collector resistance R28 which forward biases and turns on an NPN transistor Q10 which applies logic 0 on a lead T0 to reset the bistable latch G1-G2 in the PWM LOGIC circuit and thereby terminate the control pulse and turn off power switch PS.

The base of transistor Q8 is coupled to a voltage divider comprising the serial arrangement of a resistance R79, a diode D7, and a resistance R21 connected between ground and the voltage source +5V. The collector of transistor Q8 is coupled through a resistance R23 in series with timing capacitor C9 to ground, and the emitter of transistor Q8 is connecteed to the +5 volt source through the serial arrangement of an emitter resistance R24, and the INCH POT and SPEED POT potentiometers whose settings determine the magnitude of collector current in transistor Q8, and thus the time duration of the control pulses. When the voltage on the emitter of timing transistor Q9 reaches a predetermined level, timing transistor Q9 turns on. The flow of current through collector resistance R28 forward biases the base of transistor Q10 which conducts to connect lead T0 to ground and thus change the output of gate G2 to logic 1 which resets the bistable latch G1-G2 of the PWM LOGIC circuit and provides logic 1 output from gate G3 to thereby terminate the control pulse to drive current regulator DCR and turn off power switch PS. As the resistance of speed potentiometer SPEED POT is increased, the collector current in transistor Q8 is decreased so that the rate of rise of voltage across timing capacitor C9 is lower and the on-time of power switch PS is longer.

In accordance with the invention, speed potentiometer SPEED POT is bidirectional and its resistance element has a midtap which is connected to one side of the INCH POT potentiometer whose wiper is coupled to resistance R24. The wiper W of speed potentiometer SPEED POT is coupled to the +5 volt source so that the speed potentiometer resistance is minimum when wiper W engages the midtap and increases when the wiper W is moved in either direction from the midtap to thereby decrease collector current in transistor Q8 and increase the duration of the control pulses. Wiper W of speed potentiometer may be secured to, and activated by, a manual direction and speed selecting lever DS for the vehicle. Lever DS has a neutral position wherein neither the forward nor reverse contactor is energized and the wiper W engages the resistance element mid-tap so that the time duration of the control pulses is a minimum. Lever DS may be adapted, when operated in one direction from the neutral position to activate wiper W away from the potentiometer midtap, to close a pair of normally open switch contacts S1 to complete an energizing circuit to the operating coil F of the forward contactor and may also be adapted, when operated in the opposite direction from the neutral position to actuate wiper W from the potentiometer midtap, to close a pair of normally open switch contacts S2 to complete an energizing circuit to the operating coil R of the reverse contactor. One side of the contactor operating coils F and R may be commoned and connected to the positive terminals of battery BATT, and one side of the switch contacts S1 and S2 may be commoned and connected to the collector of a power type transistor Q22.

A potentiometer failure detection circuit PF monitors the resistance of speed potentiometer SPEED POT and automatically reduces the duty cycle of the pulses supplied by power switch PS to motor 10 in the event of potentiometer failure. Usually a potentiometer failure is caused by an open circuit as a result of a faulty wiper or a discontinuity in the resistance element, and such failure in prior art systems usually resulted in 100 percent duty cycle which would tend to drive the motor M at maximum speed and could create an unsafe condition wherein the vehicle is out of control.

An NPN transistor Q5 of potentiometer failure circuit PF has its collector coupled through a resistance R12 to the +5V supply and its emitter grounded. The ends of the resistance element of speed potentiometer SPEED POT are commoned and the base of transistor Q5 is connected through the series arrangement of two resistances R10 and R9 to the commoned ends of the potentiometer SPEED POT. As long as the potentiometer resistance element is continuous, positive base drive from the +5V supply is coupled through wiper W, the SPEED POT resistance element, and series resistances R9 and R10 to the base of transistor Q5 so that Q5 remains forward biased and conducting. The collector of transistor Q5 is connected through an inverter, or NOT gate NOT 5 to an input of gate G3 of the PWM LOGIC circuit. When transistor Q5 conducts a substantially ground (logic 0) signal exists on its collector which is converted by gate NOT 5 to logic 1 input to gate G3 so that the gate G3 operates normally to transmit control pulses to power switch PS, i.e., gate G3 provides logic 0 to turn on power switch PS at the leading edge of each guard pulse from multivibrator GPM and provides logic 1 when variable delay circuit VDS provides logic 0 on lead TO at the end of the timing cycle to turn off power switch PS.

If the speed potentiometer SPEED POT should open, base drive from the +5V supply is removed from transistor Q5 and it turns off so its collector goes to logic 1 voltage. The logic 1 is converted by gate NOT 5 to logic 0 at the input to gate G3 so that its output goes to logic 1 to turn off power switch PS.

Each logic 0 guard pulse is applied to NAND gate G4 and its logic 1 output is coupled to an input to gate G3 so that gate G3 provides logic 0 to turn on power switch PS at the leading edge of each guard pulse. However, if transistor Q5 is turned off because of a faulty speed potentiometer, the output of gate G4 goes to logic 0 as soon as the guard pulse disappears, and gate G3 provides logic 1 output to turn off power switch PS. The width of the guard pulse is approximately 30 microseconds so that the on-time of power switch PS is automatically reduced to less than 0 percent whenever an open circuit occurs in speed potentiometer SPEED POT.

A relaxed throttle circuit RT monitors the resistance of speed potentiometer SPEED POT and provides logic signals to the PWM LOGIC circuit and to a contactor logic CL circuit when the direction and speed selecting lever DS is at the neutral position wherein the resistance of speed potentiometer SPEED POT between its midtap and wiper is very low. When lever DS is at the neutral position wherein wiper W engages the midtap of potentiometer SPEED POT, a NOT gate, or inverter NOT 6 provides logic 0 to an input to gate G2 of the PWM LOGIC circuit which provides logic 1 on lead LO to lock out the variable delay circuit VDS and prevent it from initiating a timing cycle as long as lever DS is at neutral. The logic 1 from gate G2 on lead LO reverse biases transistor Q9 of the variable delay circuit to prevent it from operating. As soon as lever DS is moved slightly in either direction from the neutral position, the output of gate NOT 6 will go to logic 1 and thereby permit gate G2 to provide logic 0 output to enable delay circuit VDS when a guard pulse converts the output of gate G1 to logic 1. The logic 0 from gate G2 on lead LO turns on timing transistor Q9 to initiate a timing cycle.

The power supply +5V is coupled to the wiper W of speed potentiometer SPEED POT and through the midtap of its resistance element and a diode D6 to the base of a PNP transistor Q6 of the relaxed throttle circuit RT and reverse biases it to the off state when lever DS is in the neutral position. As long as transistor Q6 is off, the base of an NPN transistor Q7 is at ground potential and it remains nonconducting, and the logic 1 existing at the junction of two series resistances R14 and R17 of a voltage divider is converted by inverter NOT 6 to logic 0 on an input to gate G2 of the PWM LOGIC circuit, thereby disabling the variable delay circuit VDS. This voltage divider comprises the series arrangement of the resistances R14, R17, and R18 connected between the +5V source and ground. The emitter of transistor Q6 is connected to the junction of two resistances R13 and R15 forming a voltage divider between the +5V source and ground. The speed potentiometer SPEED POT is connected in series with diode D6 and resistance R18 between the +5V supply and ground, and the base of transistor Q6 is coupled to the junction of diode D6 and resistance R18 so D6 is forward biased when lever DS is at the neutral position. As the direction and speed selecting lever DS (i.e., the throttle) is moved further from the neutral position, the voltage across speed potentiometer SPEED POT increases and the potential at the base of PNP transistor Q6 becomes more negative. As soon as the voltage drop across potentiometer SPEED POT plus the drop across diode D6 becomes greater than the base-emitter drop of transistor Q6 plus the voltage drop across resistance R13, transistor Q6 will start to turn on. The collector current of transistor Q6 flowing through resistance R20 develops a voltage drop which forward biases the base of transistor Q7 and turns it on. The current flow through transistor Q7 develops a voltage drop across resistance R17 which increases the forward bias on the base of transistor Q6 and causes it to turn on "hard." Turning on transistor Q7 clamps the input of gate NOT 6 to ground so that it provides logic 1 to gate G2 when the throttle lever DS is actuated away from the neutral position, thereby permitting gate G2 to enable the delay circuit VDS and generate the leading edge of a control pulse when a guard pulse changes the output of gate G1 to logic 1.

Gate NOT 6 of relaxed throttle circuit RT also supplies logic 0 to contactor logic circuit CL (shown in block form) when lever DS is at neutral and changes this signal to logic 1 when lever DS is moved slightly in either direction from neutral. The contactor logic circuit CL provides desired interlocking and sequencing between the vehicle seat switch (not shown), the ignition switch, direction and speed selecting lever DS, and the forward and reverse contactors during start-up and reversal of the truck and will not be described in detail since it forms no part of the present invention and detailed description thereof would unduly lengthen the description. When the truck operator has followed the proper sequence of operations such as first sitting on the seat before turning on the ignition switch and then moving lever DS from neutral, circuit RT initially supplies logic 0 and subsequently supplies logic 1 to the contactor logic circuit CL which in response thereto applies logic 0 to the base of a driver transistor Q21 to turn in on. The flow of collector current in driver transistor Q21 through a collector resistance R70 forward biases the base-emitter circuit of power transistor Q22 so that it turns on to energize the operating coil F or R of the forward or reverse contactor (depending on whether contacts S1 or S2 are closed by lever DS) and thereby operate the corresponding contactor. When speed and direction selecting lever DS is actuated slightly away from the neutral position to close switch contacts S1 or S2, the "direction change" signal generated by closure of contacts S1 and S2 is sensed by a controlled plug circuit CP shown in block form and disclosed in U.S. Pat. No. 3,828,235. If the truck is traveling in the direction opposite to that selected by lever DS, motor 10 will operate as a generator and pump armature current through armature diode AD. A reed relay RR detects when the current through armature diode AD reaches a predetermined magnitude and closes its contacts to provide a logic 0 "generator mode" signal to the controlled plug circuit CP. When both the direction change and generator mode signals are present, the controlled plug circuit CP initiates a time delay of sufficient duration to assure operation of the forward or reverse contactor and, after the expiration of the time delay, provides a "plugging mode" signal to the oscillator OSC. The plugging mode signal causes oscillator OSC to provide triggering pulses at a reduced frequency, thereby reducing the duty cycle of the control pulses to power switch PS to lower values than the range of percent duty cycle utilized during normal operation. Such reduced percent duty cycle lowers the excitation of field winding FLD and thereby provides the reduction in armature current necessary for smooth plugging of motor 10.

The control discriminates between the condition when motor 10 is acting as a generator and vehicle travel is opposite to that selected by lever DS so that plugging is desirable and the condition when motor 10 is acting as a generator but direction lever DS has not been reversed, for example when the truck is rolling backward down a ramp so motor 10 is being operated as a generator but full power (rather than plugging) is desired to drive the truck up the ramp.

While only a single embodiment of my invention has been illustrated and described, many modifications and variations thereof will be readily apparent to those skilled in the art, and consequently, it should be understood that I do not intend to be limited to the particular embodiment shown and described.

The embodiments of the invention in which an exclusive property or privilege is claimed are defined as follows:

1. In a vehicle driven by a d.c. traction motor energized by unidirectional pulses of current supplied from a battery through a semiconductor power switch and having forward and reverse contactors which control the direction of said motor to propel said vehicle in the forward and reverse directions respectively, a time-ratio control for selectively varying the duty cycle of said pulses to thereby regulate the speed of said motor including a variable delay RC timing circuit having a timing capacitor in series with a bidirectional speed potentiometer, said speed potentiometer having a resistance element provided with a midtap and a movable wiper adapted to slidably engage said resistance element to vary the resistance of said speed potentiometer in series with said timing capacitor and thereby regulate the time duration and duty cycle of said pulses, said RC timing circuit being in series with the resistance of said speed potentiometer between said wiper and said midtap, whereby movement of said wiper in either direction from said midtap increases the resistance in said timing circuit and thereby varies the time duration of said pulses, and direction control means for completing respective energizing circuits to said forward and reverse contactors when said wiper is moved in opposite directions away from said midtap.

* * * * *